United States Patent [19]

Stewart

[11] Patent Number: 4,758,919
[45] Date of Patent: Jul. 19, 1988

[54] SECTIONALIZER FOR SPUR LINES

[75] Inventor: John S. Stewart, West Bridgeford, England

[73] Assignee: Brush Switchgear Limited, Loughborough, England

[21] Appl. No.: 817,069

[22] Filed: Jan. 8, 1986

[30] Foreign Application Priority Data

Aug. 1, 1985 [GB] United Kingdom ................. 8500646

[51] Int. Cl.[4] .......................... H02H 3/05; H02H 3/08
[52] U.S. Cl. ....................................... 361/63; 361/67; 361/87; 361/93; 361/114; 361/42
[58] Field of Search ........................ 361/62, 63, 67, 71, 361/72, 73, 74, 75, 114, 115, 93, 94, 98, 87, 42, 44

[56] References Cited

U.S. PATENT DOCUMENTS

| | | | |
|---|---|---|---|
| 2,574,801 | 11/1951 | Thompson et al. | 361/71 |
| 4,038,695 | 7/1977 | DePuy | 361/42 |
| 4,181,922 | 1/1980 | Matsko | 361/115 |
| 4,259,706 | 3/1981 | Zocholl | 361/93 |
| 4,316,230 | 2/1982 | Hansen | 361/114 |
| 4,423,459 | 12/1983 | Stich | 361/94 |
| 4,553,188 | 11/1985 | Aubrey et al. | 361/115 |
| 4,642,724 | 2/1987 | Ruta | 361/93 |

Primary Examiner—A. D. Pellinen
Assistant Examiner—H. L. Williams
Attorney, Agent, or Firm—Spensley Horn Jubas & Lubitz

[57] ABSTRACT

Fault currents in the phases of a three-phase supply are detected by transformers 28 in respective phase links 14 and are counted by associated circuits 24 when any one of the circuits 24 reaches a predetermined count level, or when there is a fault condition, a low VA trip coil 42 is energized so as to release latches which hold the phase links 14 in their operative positions and thereby cause all three links 14 to drop out together.

12 Claims, 4 Drawing Sheets

SECTIONALIZER FOR SPUR LINES

The invention relates to so-called sectionalisers as used in overhead electrical distribution systems and which are operative to isolate a line section which is subject to a persistent fault condition.

In an overhead distribution system a line is commonly fed through a so-called auto-recloser, which is a self-contained pole mounted circuit breaker which trips instantaneously on the occurrence of a line fault and automatically recloses after a given dead time, during which a transient fault will have cleared. If the fault persists the auto-recloser again trips and re-closes, and it repeats this procedure for a pre-set number of times, say four, when it locks out if the fault has not cleared.

To avoid a persistent fault on a spur line causing the auto-recloser to lock out and isolate the whole line network, each spur line may contain a pole-mounted sectionaliser which is essentially a load-break, fault-make switch which has the ability to count pulses of fault current and automatically to open, after a predetermined count, during a dead time of the controlling auto-recloser. If the pulses of fault current cease before the predetermined count is reached, the sectionaliser resets and commences a new count when the next fault occurs. The predetermined count is less than the number of trips to lock-out of the auto-recloser so that, in the event of a persistent fault, opening of the sectionaliser to isolate the spur line concerned will be followed by reclosing of the auto-recloser to restore power to the rest of the system.

Thus the sectionaliser replaces conventional line fuses, with the advantage that the supply is not cut off as the result of a transient fault. However, sectionalisers at present commercially available are plain-break oil-filled devices which are correspondingly costly, and this limits their use as a replacement for expulsion fuses. An automatic sectionaliser module has been developed by the Electricity Council Research Centre which is of relatively low cost and comprises a copper tube link which can be fitted to an expulsion fuse mount. It carries current transformers and contains an electronic circuit which counts pulses of fault current and, after a predetermined count, fires a chemical actuator which unlatches the module from the mount thus allowing it to swing down to the drop-out position.

Although this ECRC sectionaliser meets the cost objection of the present oil-filled devices it has two main disadvantages. The first of these is the single-phase operation with independent modules fitted in the three phases of the line, so that only one phase of the supply may be lost causing electric motors to burn out, for example; the second is that after the fault has been cleared the linesman has to replace the chemical actuator. Furthermore, the count of fault current pulses to drop-out cannot be adjusted, and the device is not able to detect earth faults.

The object of the invention is to provide an automatic sectionaliser with the cost effectiveness of the ECRC device whilst providing three-phase operation, and which can be designed to overcome other of the foregoing disadvantages.

According to the invention an automatic sectionaliser comprises three phase links at least two of which embody current transformers and associated electronic circuitry operative to count pulses of fault current and to provide an output signal after a predetermined count on occurrence of fault condition, said links being retained in operative current-conducting position by common latch means which on release allow all three phase links to swing down to a drop-out position, and a latch-operating mechanism operative to release the latch means as a result of energization of a low VA trip coil by an output signal from any one of the phase links.

Such energization of the trip coil may release energy stored in an actuating spring of the latch-operating mechanism.

It will be appreciated that operation of each phase link is somewhat analogous to that of an expulsion fuse, except that all the phases drop-out together and that replacement of the link actuator is not required to restore the supply but merely resetting with re-egagement of the latch means. Thus each link with its electronic circuit and current transformer may be figuratively referred to as an "electronic fuse". It is preferred that three such electronic fuses be employed, although if desired the sectionaliser may employ only two links of this nature with a solid link provided in the third phase.

Said electronic circuitry may comprise an output capacitor which is charged up to provide the output signal which operates the latch trip coil. The counting circuit may comprise a CMOS logic circuit with memories and latches, and the predetermined count to drop-out is preferably adjustable. Such an adjustment may employ a switch which shorts out part of the logic of the counting circuit. For example, the sectionaliser may be adjustable for alternative counts to drop-out of 2 or 3.

Each link may embody a further current transformer, with the three further transformers residually connected for earth leakage protection. These transformers may operate a separate low VA shunt trip coil to release the latch means.

The three links may be coupled to a pole-mounted manual charge handle, to enable them to be re-engaged with automatic re-setting of the latch means by a linesman, after the fault which resulted in drop-out has been cleared.

The invention is further described hereinafter, by way of example, with reference to the accompanying drawings, in which.

Figure 1:
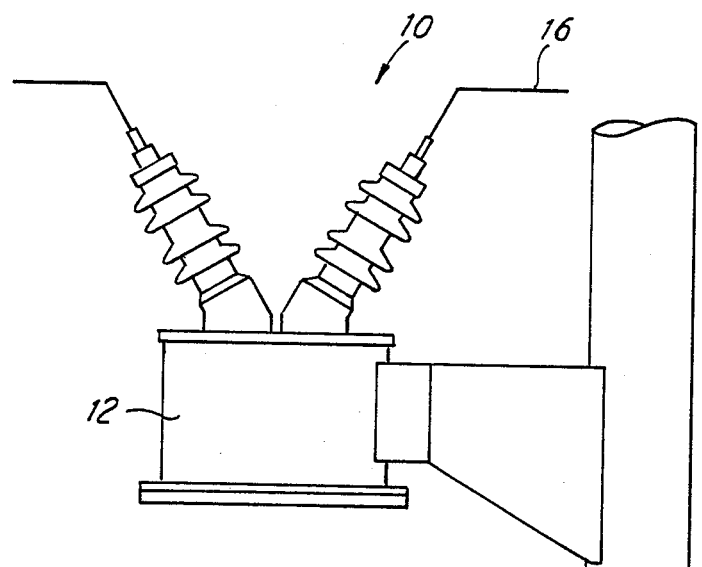
FIG. 1 is a side elevation of a sectionaliser in accordance with the invention showing the sectionaliser mounted and connected in an overhead transmission line.

The sectionaliser 10 comprises a mounting carrier frame 12 which has three aligned link carriers 14 (only one of which is shown) respectively connected to the three phase on one side of an overhead line 16 in which the sectionaliser 10 is connected, and three adjacent, aligned corresponding fuse mounts 18 respectively connected to the three phases of the other side of the line 16. The carriers 14 and mounts 18 are independently mounted on the frame top plate 16. Three aligned phase links or "electronic fuses" 20 are pivotally connected to the carriers 14, and in the operative current-conducting position they are engaged with the mounts 18 and latched thereto by common mechanical latch means which are not illustrated. The links are shown open i.e. tripped in FIG. 3.

Figure 2:
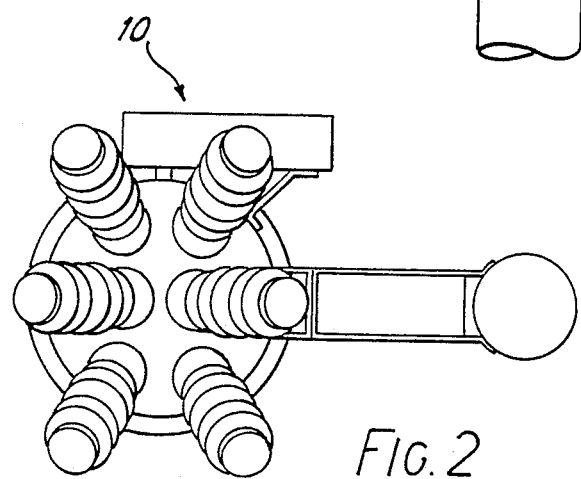
FIG. 2 is a plan view of the sectionaliser of FIG. 1.

Each of the link carriers 14 a respective current transformer 28. Each transformer 28 serves to detect a fault current pulse in the respective phase and provides an output signal which is applied to a trip circuit 24 which comprises a CMOS logic circuit operative to count fault current pulses through the body 1, and a trip capacitor 40 which is charged after a predetermined count to provide an output signal. The circuit 24 is described in greater detail below with reference to FIG. 5. A latch-operating trip mechanism 26 which operates to open the links 20, is mounted on the frame 12 at one side thereof, and an output signal from any one of the phase links 20 energizes a low VA trip coil 42 which releases energy stored in an actutating spring of the mechanism 26. This pivots the links 20 to the drop-out position as shown in FIG. 2.

The predetermined count of the counting circuit is adjustable, for example alternative counts to drop-out of 2 and 3 being provided.

Figure 5:
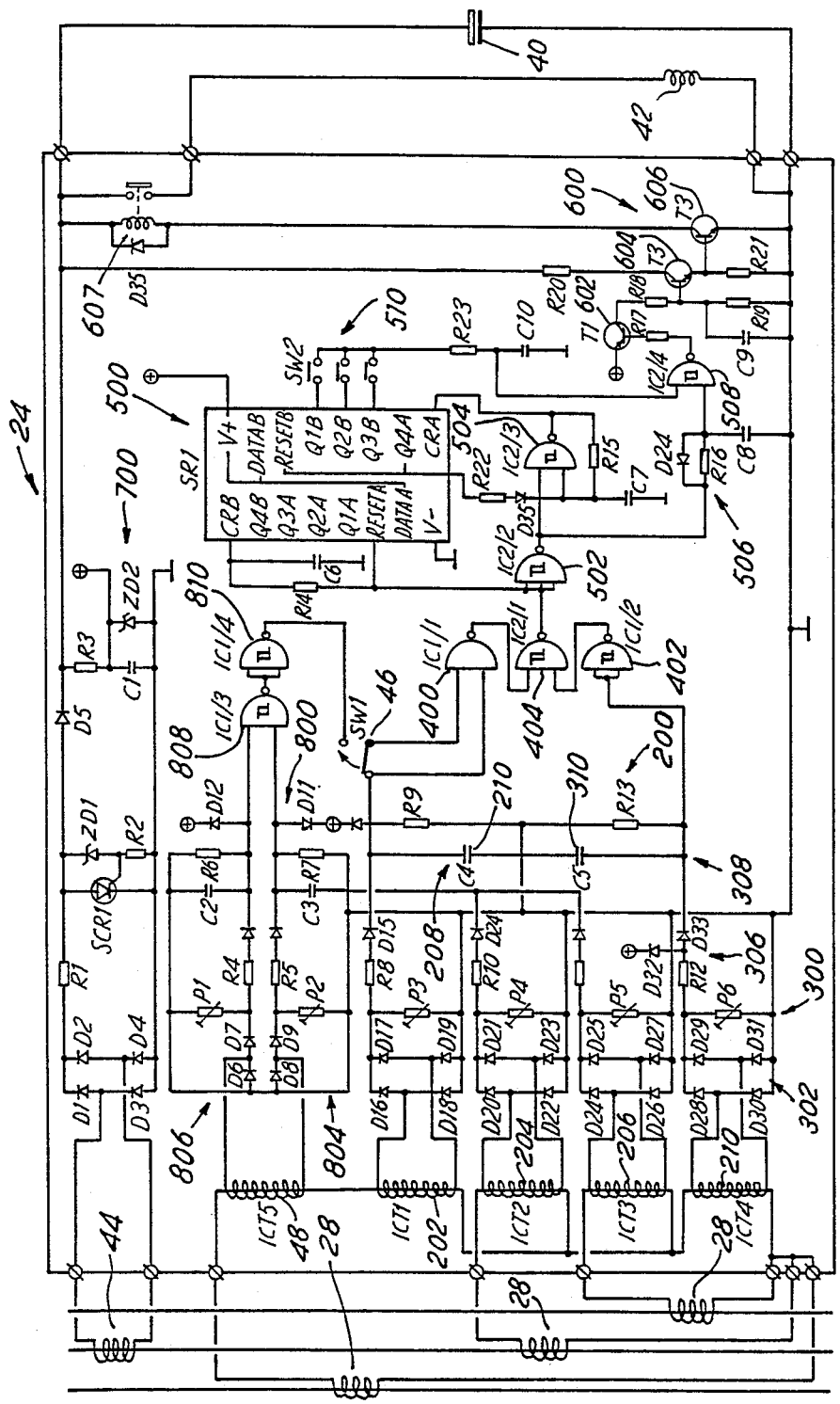
FIG. 5 is a circuit diagram of a trip circuit of the sectionaliser.

Referrring now to FIG. 5, this shows the trip circuit 24 which causes the sectionaliser 10 to trip in the dead time of an auto-recloser after a pre-set number of curved pulses indicating a phase fault or an earth fault have occurred.

The trip circuit 24 has a phase fault detector circuit 200 and an earth fault detector circuit 300, the outputs of which are coupled through logic gates 400, 402 and 404 to a counter circuit 500. The counter circuit 500 counts the number of fault pulses which are received from the fault detector circuits and, in dependence on this, fires a trigger circuit 600 to discharge the trip capacitor 40 through the trip coil 42 to trip the latch mechanism. The trip capacitor 40 is charged through a charging circuit 700 which is powered by a current transformer 44.

A magnetising inrush current discrimination circuit 800 can be coupled to an input of the logic gate 400 through switch 46, as is described below. The discrimination circuit is powered by a magnetic inrush current transformer 48.

The phase fault detector circuit 200 has three phase fault sensing transformers 202,204,206 each of which is inductively coupled to a respective one of the current transformers 28. The output of each sensing transformer is connected to a respective full wave bridge rectifier D16-D19, D20-D23, D24-D27 each of which has an associated output preset potentiometer P4,P5,P6 across which a voltage is developed proportional to the current in the associated phase of the sectionaliser. The voltages developed across these resistances are further smoothed by further smoothing circuits each consisting of a series resitance R8, R10,R11 and diode D15,D24,D28 and a common smoothing circuit 208 and applied to a first input of logic gate 400 which is a Schmitt NAND gate. A second input of this gate 400 is connected to switch 46 so as to be switchable between the output of the discrimination circuit 800 and the output of the detector circuit 200, the gate 400 being shown connected to the latter in the drawing.

A voltage representative of the peak current in any of the three sectionaliser phases is therefore applied to the first input of the NAND gate 400 and if this voltage exceeds the threshold voltage of the gate, i.e. represents a fault current pulse, the output of the gate will switch to logic 0 provided that the second input of the NAND gate 400 is at logic 1. As the circuit is drawn in FIG. 5, the second input of NAND gate 400 is connected by switch 46 to the fault detector circuit 200 and thus this input is also at logic 1 when the fault current pulse occurs.

Referring now to the earth fault detector circuit 300, if an earth fault occurs, the resulting imbalance in the three phase currents, and therefore in the currents in the transformers 28, will result in a voltage being developed across transformer 210 which is inductively coupled to transformers 28. This voltage is, rectified by a full wave rectifier circuit 302 and applied across a preset potentiometer P6. This voltage is then smoothed by smoothing circuits 306, 308 and applied to both inputs of a further NAND gate 402. Both outputs of the gates 400 and 402 are connected to respective inputs of a further gate 404, with the gates 400,402 and 404 being connected in OR configuration so that a logic 1 input, i.e. a fault condition, to either gate 400 or gate 402 causes the output of gate 404 to switch to logic 1.

Figure 3:
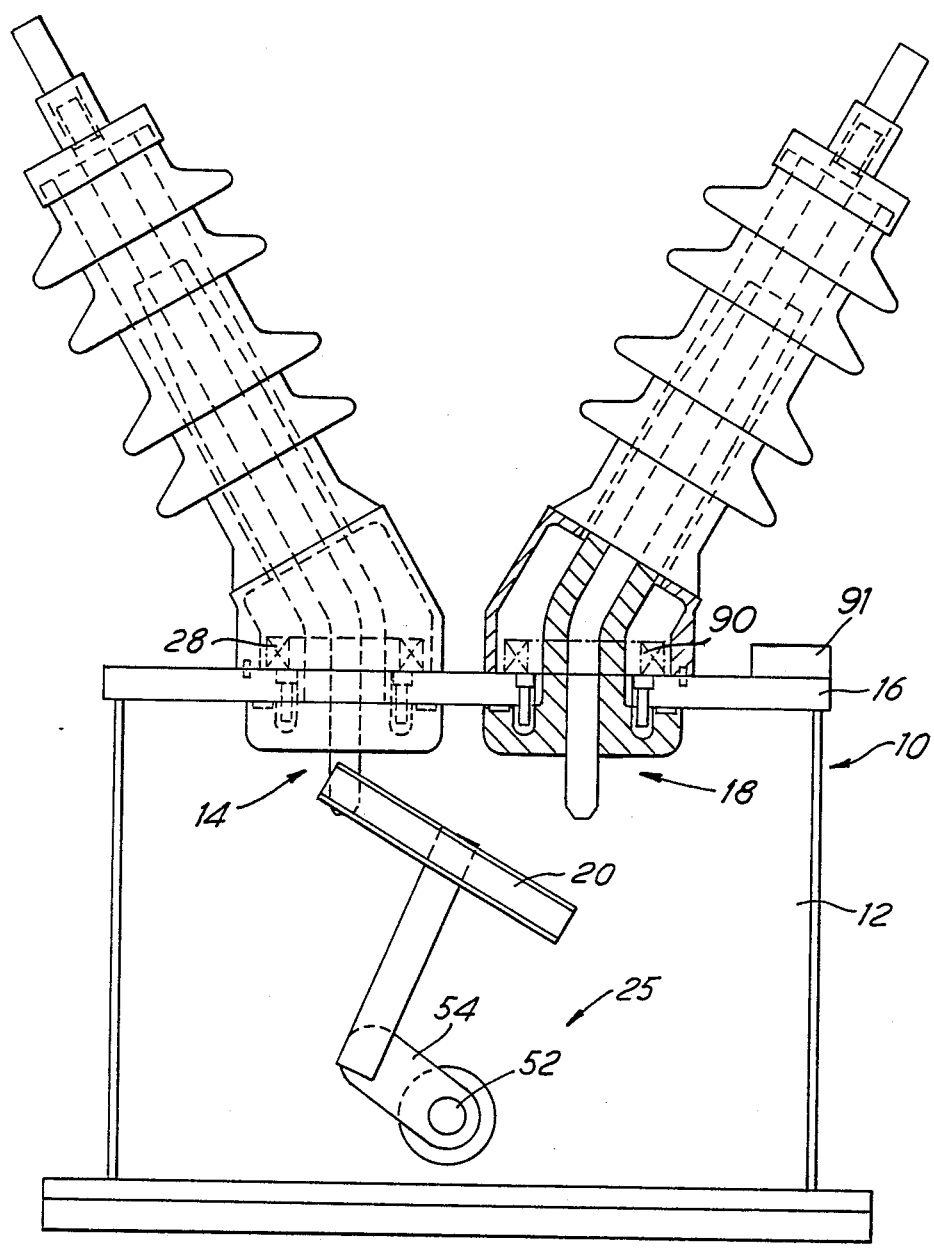
FIG. 3 is a view similar to that of FIG. 1 showing the sectionaliser partly in section.

The output of gate 404 is applied to the input of a counter 500 which includes two shift registers diagrammetically illustrated as a single integrated circuit with the pin connections for the first shift register labelled "A" and for the second shift register "B". The output of gate 404 is applied to the input of an inverter 502 and also directly to the reset input of shift register A. The output of the inverter 502 is connected to an input of an astable multivibrator 504 whose output is connected to the clocking input of shift register A. The output of inverter 502 is also connected through a time delay circuit 506 consisting of a series resistance R14 and shunt capacitance C6 to a first input of a NAND gate 508 whose other input is switchable between the three outputs Q1B-Q3B of the second shift register B by means of a switch 510. The fourth output Q4A of shift register A is connected to the reset input of shift register B. Switch 510 enables the number of fault current pulses required to trip the latch-operating mechanism 26 to be selected in the range 1-5. The switch 510 is shown in FIG. 3 connected to output Q2B of shift register B, thus selecting two fault current pulses for tripping of the mechanism 26.

If a fault occurs, and a fault current pulse is detected by one of the detector circuits 200 and 300, a logic 1 signal is generated at the output of gate 404 as described above. This resets the outputs of shift register A and at the same time is applied to the clock input of shift register B to clock the latter. Thus a logic 1 signal occurs at the first output Q1B of shift register B. The output of gate 404 also drives the output of gate 502 to logic 0 which discharges capacitor C8 through the diode D34 of the timing circuit 506 to set the second input of NAND gate 508 at logic 0. The output of gate 508 is therefore at logic 1, regardless of the signal on its first input. In addition, the logic 0 output of gate 502 disables the astable multivibrator 504.

When a line fault occurs, the auto-recloser trips, causing the fault current to drop. This results in the voltage across either capacitance 210 or 310 falling, depending on whether or not the fault is a phase or earth fault, with the result that the output of gate 404 is changed to logic 0. Both the shift register A and the astable multivibrator 504 are therefore enabled by the change in output in gate 404 and the astable multivibrator begins to oscillate at the preset rate of 1 cycle every 25 seconds. At the occurrence of each positive edge of the pulse waveform from the astable multivibrator 504 shift register A is clocked to switch each of its outputs Q1A-Q4A in turn to logic 1. Thus the time between tripping of the auto-recloser and the switching of output Q4A to logic 1, and therefore resetting of shift register B, is approximately 100 seconds. The time of 100 seconds is chosen to be longer than the longest dead time setting of the auto-recloser so that the latter closes during the above operation. If the fault has in the meantime cleared then the above operation is not interrupted and shift register B is reset.

If, however, the fault is still present then closing of the auto-recloser will generate a further fault signal, i.e. logic 1 at the output of gate 404. This resets shift register A preventing it resetting shift register B and clocks shift register B for the second time, switching the output Q2B of shift register B to logic 1. Thus a logic 1 signal is applied to the first input of NAND gate 508. However, the closing of the auto-recloser has reset the signal on the second input of NAND gate 508 to logic 0 and therefore the output of NAND gate 508 remains at logic 1.

If, now, the auto-recloser re-opens because of the continued presence of the fault, the output of gate 404 is reset to logic 0 and the output of inverter 502 is therefore reset to logic 1. After a time delay set by the timing circuit 506, the second input of NAND gate 508, therefore, also changes to logic 1 thus switching the output of the gate to logic 0. This signal is applied to a trigger circuit 600, turning on cascaded transistors 602, 604, 606 to energize relay 607, discharging the trip capacitor 40 through the trip coil 42 and opening the sectionaliser in the dead time of the auto-recloser.

Magnetising inrush current restraint is provided, if required, by the circuit 800. As will be appreciated by those skilled in the art, when power is first applied to the line 16, the resulting A.C. waveform includes a D.C. offset component which, in the worst case condition, can reach 100%, thus doubling the peak value of the first half-cycle of the wave form. Although the D.C. component decays away in the first few cycles, the peak value on the first half cycle can sometimes exceed the actuating current and result in a false fault signal being detected by the trip circuit 24. However, even if a large D.C. component is present, the peak value of the half cycle will not exceed the actuating current on both the positive and negative half cycles and the discrimination circuit 800 uses this fact to prevent the D.C. offset component generating a fault condition in the trip circuit 24.

The current flowing in the line 16 is detected by a magnetising inrush current transformer 48 inductively coupled to one of the transformer 28, and applied to half wave rectifier circuits 804 and 806, each of which rectifies respectively the positive and negative half cycles of the output wave form from the transformer 48.

Each rectifier circuit 804, 806 comprises two diodes D6, D7 and D8, D9. The rectified output is applied across a respective shunt preset potentiometer set to the same value as potentiometer P3,P4 and P5. The output of each potentiometer P1,P2 is applied to a smoothing circuit consisting of a capacitance C2, C3 and two resistances R4, R6 and R5, R7.

The outputs of the two rectifier circuits are fed to respective inputs of a NAND Gate 808 whose output is applied to the input of an inverter gate 810. The output of gate 810 is connected to switch 46 which is used selectively to connect the second input of NAND gate 400 to the output of gate 810. Under normal conditions, the output of gate 810 is logic 0 so that, if connected to the second input of gate 400, the latter is disabled. If either the positive half cycle or the negative half cycle, but not both, exceed the actuating current, the output of gate 810 remains at logic 0. If, however, both half cycles exceed the actuating current, the output of gate 810 is switched to logic 1, enabling gate 400 and allowing the trip circuit to operate.

Figure 4:
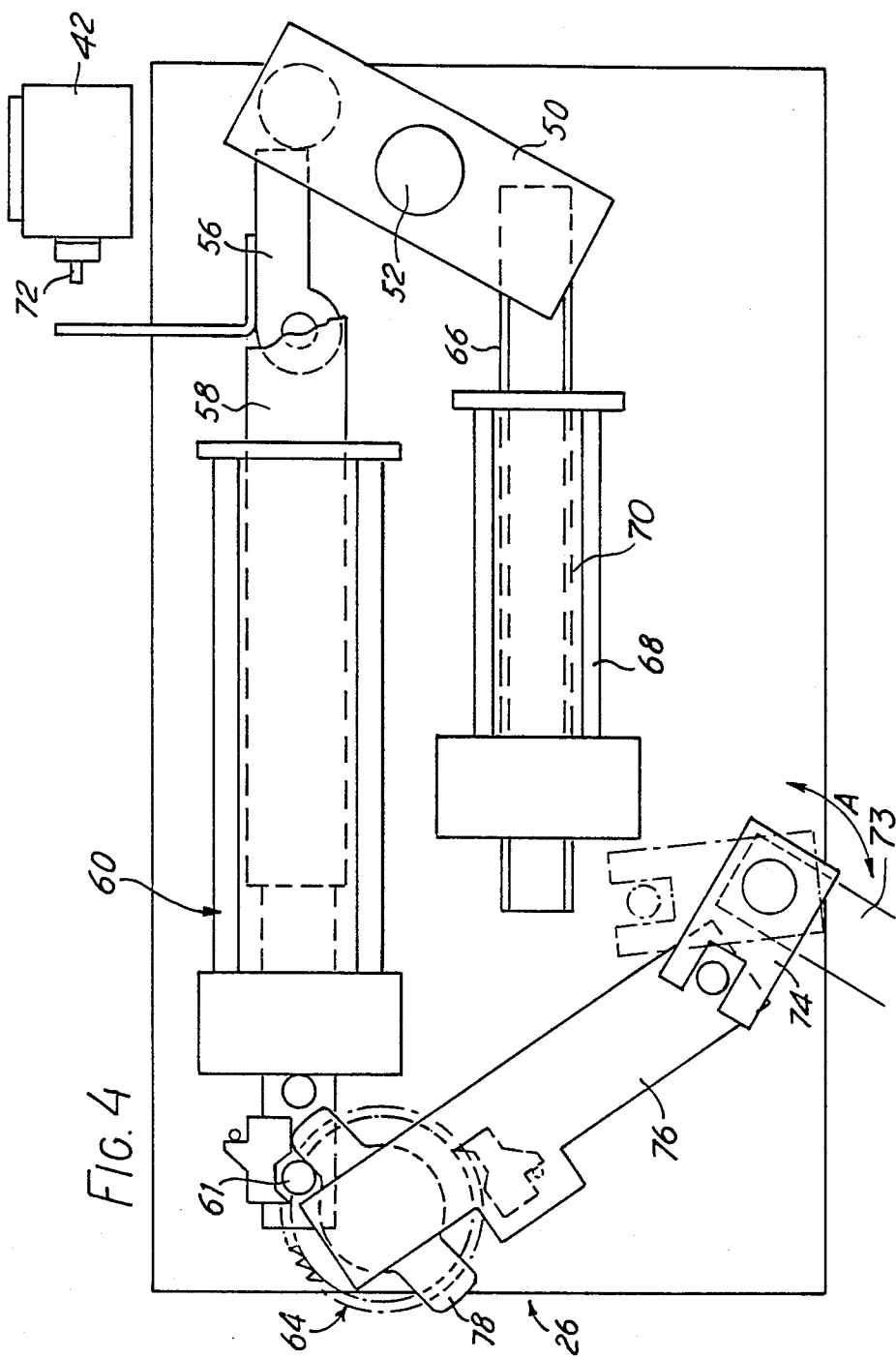
FIG. 4 is a view of a trip mechanism for the sectionaliser.

The trip mechanism 26 is shown schematically in FIG. 4. It has a lever 50 which is secured intermediate its ends to a pivot rod 52 which in turn is secured to one lever 54 of a linkage 54 connecting the pivot rod 52 to the links 20. Rotation of the lever 50 in a clockwise direction as seen in FIG. 4 closes the links 20 while rotation in the reverse direction opens the links. The reip mechanism is shown in its untripped position, that is with the links 20 closed. In this position, a lug on one end of the lever 50 abuts a stop 56 whose other end is pivoted on a co-axial drive lever slidable in a guide 60, the lever 58 being slidable to the left as seen in FIG. 4 against the action of a closing coil spring 62 surrounding the rod 58. The end of the lever 58 remote from the lever 50 carries a lug 61 which cooperates with a pawl and ratchet mechanism 64.

The other end of the lever 50 is coupled to an opening rod 66 which is arranged parallel with the lever 58 and is slidable in a further guide 68, the rod 66 also being slidable to the left as seen in FIG. 4 against the action of an opening coil spring 70 around the rod 66.

In the closed position of the links 20, the spring 70 is in a compressed state.

When a fault condition is sensed and the shunt trip coil 42 energised, a movable central bolt 72 of the latter is moved to the left as seen in FIG. 4 to pivot lever 56 anti-clockwise and release lever 50. The latter, under the action of the compressed coil spring 70 is rapidly pivoted anti-clockwise to rotate pivot rod 52 and open the links 20 through the linkage 54.

After the sectionaliser 10 has dropped out and the persistent fault responsible has been cleared, a linesman can re-engage the links 20 by pivotal movement of a manual charge handle 73 which oscillates a lever 74 of the trip mechanism as shown by arrow A in FIG. 4. This lever 74 is coupled to a racking lever 76 for the ratchet mechanism 64. Oscillation of the lever 74 winds the ratchet mechanism anti-clockwise during which movement a butterfly 78 which is rotated with the ratchet mechanism axially moves the drive lever 58 to the left by its engagement with the lug 61 on the latter. Movement of the rod 58 tensions the spring 62 until the butterfly 78 clears the lug 61, releasing the ratchet and allowing the closing spring 62 to drive the lever 58 to the right. The stop 56 which, in the meantime, has returned to its rest position is driven against the lug on the lever 50, pivoting the latter in its clockwise direction to close the links 20 and at the same time compress the opening spring 70 ready for the next operation of the trip mechanism.

A respective a further current transformer 90 may be provided for each phase with the three transformers 90 being residually connected in parallel to another low VA trip coil 91, energization of which also actuates the mechanism 26 to cause the three phase links 20 to drop-out. Thus means for earth leakage protection is provided which is completely independent of the internal logic circuity of the trip circuit 24.

The links 20 are separable contacts. The carrier housing 12 is sealed and contains an extinguishing gas such as $SF_6$.

I claim:

1. An automatic sectionaliser for a three-phase electrical supply for use in conjunction with an auto-recloser type circuit breaker, comprising:
   three phase-links, each of which is associated with a respective phase of the three-phase supply, each phase-link being movable between an operative position wherein current in said respective phase can pass therethrough and an inoperative position wherein current in said respective phase cannot so pass,
   respective current transformers embodied in each of at least two of said three phase-links for detecting fault current pulses associated with operational responses of said circuit breaker in response to fault current,
   an electronic circuit associated with said current transformers for counting pulses of fault current in the respective phase of the three phase supply, said electronic circuit providing an output signal during a a dead time of said circuit breaker in response to the counting of a predetermined number of fault current pulses,
   a low VA trip coil energizable by said output signal from said electronic circuit,
   latch means common to all three of said phase-links commonly in said operative positions, said latch means being releasable to allow said phase-links commonly to move to said inoperative positions, and
   a latch-operating mechanism operative to release said latch means in response to energization of said trip coil.

2. The automatic sectionaliser according to claim 1, wherein said latch-operating mechanism includes an actuating spring operatively connected to said phase-links, energy being stored in said actuating spring when said phase-links are in said operative positions, said phase-links being moved to said inoperative positions by said stored energy upon release of said latch means.

3. The automatic sectionaliser according to claim 1, wherein said electronic circuit includes a charging capacitor and means operative to generate said output signal when said capacitor has charged to a predetermined level.

4. The automatic sectionaliser according to claim 1, wherein said electronic circuit includes a counter operative to count the fault current pulses, said counter including a CMOS logic circuit having memories and latches.

5. The automatic sectionaliser according to claim 1, wherein said electronic circuit includes adjustment means operative to adjust the number of fault current pulses which are counted before said output signal is generated.

6. The automatic sectionaliser according to claim 5, wherein said electronic circuit includes a logic circuit operative to count the fault current pulses, and the respective adjustment means includes a rotary member mounted on the respective phase-link, and a microswitch actuable by rotation of the rotary member and operative upon such rotation to short out a part of said logic circuit.

7. The automatic sectionaliser according to claim 1, further comprising earth leakage protection means operative to release said latch means independently of said electronic circuit.

8. The automatic sectionaliser according to claim 7, wherein said earth leakage protection means comprises respective current transformers associated with each of said phase links, said transformers being connected for earth leakage protection.

9. The automatic sectionaliser according to claim 8, wherein said earth leakage protection means also comprises a separate low VA shunt trip coil which is responsive to signals received from any one of said current transformers connected for earth leakage protection and which is operative in response to such signals to release the latch means.

10. The automatic sectionaliser according to claim 1, wherein said phase-links are commonly operatively connected to a manually-operable charge handle, whereby said phase-links can be commonly returned to said operative positions by manual operation of said charge handle, and said latch means are automatically re-settable and are so re-set upon movement of said phase-links to said operative positions by means of said charge handle.

11. An automatic sectionaliser as claimed in claim 1, wherein said electronic circuit counts and sums up pulses of fault current detected by each of said current transformers, said circuit providing an output signal in response to the counting of a predetermined number of summed up fault current pulses.

12. A system for isolating a line section in an electrical distribution system using a three-phase electrical supply, comprising:
   auto-reclosing circuit breaker means connected to a main line in the distribution system for automatically opening the main line, and then closing it after a dead time, in response to a fault current, and
   an automatic sectionaliser in the line section comprising:
   three phase-links, each phase-link being associated with a respective phase of the three-phase supply and having both an operative position for allowing current to pass and an inoperative position for not allowing current to pass,
   respective current transformers embodied in each of at least two of said three phase-links for detecting fault current pulses associated with operational responses of said circuit breaker means to fault current,
   an electronic circuit associated with said current transformers for counting the fault current pulses in the respective phase of the three phase supply, said electronic circuit, and for providing an output signal during the dead time of said circuit breaker after a predetermined number of fault current pulses,
   a low VA trip coil energizable by said output from said electronic circuit,
   releasable latch means for placing said phase-links in said inoperative positions, and
   a latch-operating mechanism for releasing said latch means in response to the energization of said trip coil.

* * * * *